US008762445B2

(12) United States Patent
Duncan et al.

(10) Patent No.: US 8,762,445 B2
(45) Date of Patent: Jun. 24, 2014

(54) REAL-TIME MESSAGING SYSTEM FOR AN IMAGE DISPLAY DEVICE

(75) Inventors: Dave Duncan, Beaverton, OR (US); Alexander Benenson, Salem, OR (US)

(73) Assignee: Seiko Epson Corporation, Tokyo (JP)

( * ) Notice: Subject to any disclaimer, the term of this patent is extended or adjusted under 35 U.S.C. 154(b) by 297 days.

(21) Appl. No.: 13/455,009

(22) Filed: Apr. 24, 2012

(65) Prior Publication Data

US 2012/0210033 A1 Aug. 16, 2012

Related U.S. Application Data

(62) Division of application No. 12/484,070, filed on Jun. 12, 2009, now Pat. No. 8,185,594.

(60) Provisional application No. 61/061,535, filed on Jun. 13, 2008.

(51) Int. Cl.
*G06F 15/16* (2006.01)
*G06F 12/00* (2006.01)

(52) U.S. Cl.
USPC ............................................... 709/201

(58) Field of Classification Search
CPC ............ G11B 2220/2562; G11B 27/34; G11B 2220/213; G11B 2220/2541; G11B 27/034; G11B 2020/10537; G11B 20/10527; G11B 27/005; G11B 27/007; G11B 27/038; G11B 33/10; H04N 21/4122; H04N 21/4325
USPC .................. 709/201, 223–229, 250
See application file for complete search history.

(56) References Cited

U.S. PATENT DOCUMENTS

| | | | |
|---|---|---|---|
| 5,436,619 A | 7/1995 | Yun | |
| 5,486,819 A | 1/1996 | Horie | |
| 6,204,761 B1 | 3/2001 | Vanderable | |
| 6,437,786 B1 | 8/2002 | Yasukawa | |
| 6,459,359 B1 | 10/2002 | Miyashita | |
| 6,498,627 B1 | 12/2002 | Hershey et al. | |
| 6,540,664 B1 | 4/2003 | Blair | |
| 6,543,051 B1 | 4/2003 | Manson et al. | |
| 6,735,616 B1 | 5/2004 | Thompson et al. | |
| 6,760,045 B1 | 7/2004 | Quinn et al. | |
| 6,961,445 B1 | 11/2005 | Jensen et al. | |
| 7,059,722 B2 | 6/2006 | Matoba et al. | |
| 7,197,562 B2 | 3/2007 | Murtha et al. | |
| 7,307,524 B2 | 12/2007 | Adams | |
| 7,348,957 B2* | 3/2008 | Cui et al. | 345/102 |
| 7,916,317 B2* | 3/2011 | Kitamura | 358/1.14 |
| 7,949,956 B2* | 5/2011 | Imai et al. | 715/809 |
| 8,106,917 B2* | 1/2012 | Herrick et al. | 345/547 |
| 8,234,488 B1* | 7/2012 | Riach et al. | 713/100 |
| 2001/0028301 A1 | 10/2001 | Geiger et al. | |
| 2002/0057189 A1 | 5/2002 | Miyashita | |

(Continued)

*Primary Examiner* — Zarni Maung
(74) *Attorney, Agent, or Firm* — Oliff PLC (57) ABSTRACT

A real-time messaging system for an image display device is provided. One disclosed embodiment includes an image display device including a light source and an image-generation device configured to receive light from the light source, and in response, generate an image. The image display device may further include a projection lens configured to display the image on a viewing surface. The image display device may also include memory and a processor operatively coupled with the memory to receive a command message sent to a select group of image display devices in real-time via a network, and upon recognizing the command message, display an alert image.

4 Claims, 4 Drawing Sheets

(56) References Cited

U.S. PATENT DOCUMENTS

| | | |
|---|---|---|
| 2005/0005109 A1 | 1/2005 | Castaldi et al. |
| 2005/0036509 A1 | 2/2005 | Acharya et al. |
| 2005/0104745 A1 | 5/2005 | Bachelder et al. |
| 2005/0225669 A1 | 10/2005 | Tsai et al. |
| 2006/0023168 A1 | 2/2006 | Belliveau |
| 2007/0136466 A1 | 6/2007 | Etelapera |
| 2007/0199035 A1 | 8/2007 | Schwartz et al. |
| 2008/0133551 A1 | 6/2008 | Wensley et al. |
| 2009/0135093 A1 | 5/2009 | Keuenhof |
| 2009/0281850 A1 | 11/2009 | Bruce et al. |
| 2010/0321587 A1 | 12/2010 | Kerofsky |

* cited by examiner

| Text color: | White: |
|---|---|
| Background: | Black or blue (use same color for text background and screen background) |
| Aspect ratio | Use 16:9 if projector is native wide, else use 4:3: |
| Text size: | Minimum: same as OSD menu and message text<br>Maximum: sufficient to allow 8 lines of text on screen |
| Character set | Minimum: ASCII letters, digits, space. If only uppercase letters can be displayed, display lowercase letters as uppercase. Unsupported characters can be ignored. |

REAL-TIME MESSAGING SYSTEM FOR AN IMAGE DISPLAY DEVICE

CROSS-REFERENCES TO RELATED APPLICATIONS

This application is a divisional application of U.S. patent application Ser. No. 12/484,070, filed Jun. 12, 2009, which claims the benefit of U.S. Provisional Application No. 61/061,535, filed Jun. 13, 2008; the contents of each of the preceding disclosures are hereby incorporated by reference.

FIELD

The present application relates to a real-time messaging system for an image display device.

BACKGROUND

Image display devices may be used in a variety of environments. For example, image display devices, including, but not limited to projectors, televisions, monitors etc., may be adapted to display images, including text, graphics, video images, still images, presentations, etc. Such image display devices may be found in educational environments and applications, business facilities, conference rooms and other meeting facilities, etc. The following is a non-exhaustive list of exemplary image display devices: cathode ray tubes (CRTs), projectors, flat panel liquid crystal displays (LCDs) systems, LED systems, plasma systems, front projection systems, rear projection systems, LCD monitors, etc. Large format display devices may include but are not limited to televisions, front-projection systems, and rear-projections systems.

Image display devices may be configured to display image data that are stored in a storage device. For example, storage devices may include but are not limited to computers, laptop computers, personal computers, storage mediums, such as memory cards and other memory devices, cameras, telephones, Smartphones, portable data assistants, etc. The storage device may be connected, e.g. wired or wirelessly, to the image display device for display of the image data.

The image data may be transmitted to the image display device directly or through a network. For example, image data, such as stored image data, including presentations that may be created and converted, may be projected through the network on to multiple image display devices. However, image data thus transmitted may be restricted to stored files, e.g. saved presentations, audio files, video files, etc.

SUMMARY

Various embodiments related to a real-time messaging system for an image display device are disclosed herein. One disclosed embodiment includes an image display device including a light source and an image-generation device configured to receive light from the light source, and in response, generate an image. The image display device may further include a projection lens configured to display the image on a viewing surface. The image display device may also include memory and a processor operatively coupled with the memory to receive a command message sent to a select group of image display devices in real-time via a network, and upon recognizing the command message, display an alert image.

DETAILED DESCRIPTION

Image display devices may be configured to display image data that are stored in a storage device. For example, storage devices may include but are not limited to computers, laptop computers, personal computers, storage mediums, such as memory cards and other memory devices, cameras, telephones, Smartphones, portable data assistants, etc. The storage device may be connected, e.g. wired or wirelessly, to the image display device for display of the image data. The image display devices, such as projectors, may be configured to display image data in a large format for group viewing. Such presenting of information for a large group of people may occur in a variety of environments, such as a business, school, community center, conference facility, university and the like.

The inventors herein have recognized that in addition to stored image data, (e.g., presentations, graphics, text, photos, etc.) it may be desired to communicate instant image data to the image display devices. For example, instant image data may include, but is not limited to alerts, warnings and messages, e.g. weather alerts, facility lock down situation alerts, emergency warnings, instruction messages, public announcements, etc. Accordingly, the inventors have further recognized that such instant image data may be communicated to an image display device via a command message as a real-time communication. Such real-time communication to an image display device such as a projector may enable instant image data to be presented as an alert message (i.e., an alert image) viewable by one or more people. In the disclosed embodiments, and as described below, no action may be required on the part of the audience for them to receive the alert. Rather, the alert image may be sent by an administrative device and/or network to one or more such image display devices, which then display the alert image without interaction from a user of the image display device or from a member of the audience. Further, by being able to communicate in real-time, such an approach allows an alert image to be sent immediately and further, to be reconfigurable as the situation changes. Such a system capable of real-time communication of instant messages may be considered an image display device real-time messaging system, described in more detail as follows.

Figure 1:
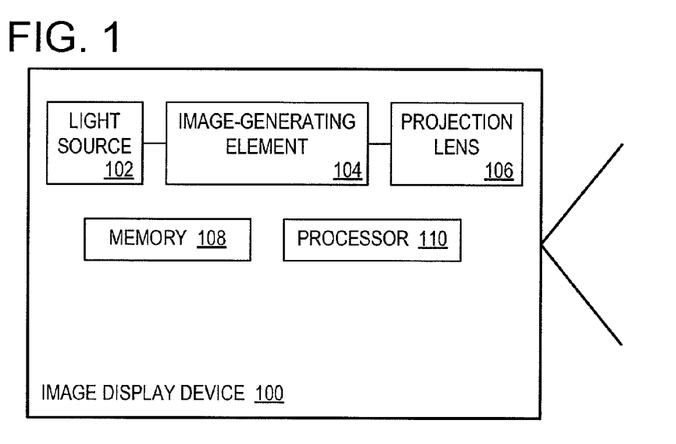
FIG. 1 shows a block diagram of an embodiment of an image display device.

FIG. 1 shows a block diagram of an embodiment of an image display device 100. As described above, such an image display device may be, for example, a projector configured to display an image in a large display format for group viewing. Image display device 100 may include a light source 102, configured to direct light toward an image-generation device 104. In some embodiments, the light source may include a lamp positioned within a reflector that may be configured to direct most of the emitted light along an optical path of the system. The light source may include any suitable type of lamp or light source, including but not limited to, metal halide lamps and ultra-high-pressure (UHP) arc lamps, lasers, light emitting diodes (LED), organic light emitting diodes, etc. Such a system may also include one or more filters, such as an infrared (IR), or ultraviolet (UV) filter, to filter out unwanted parts of the emission spectra of the lamp.

Figure 2:
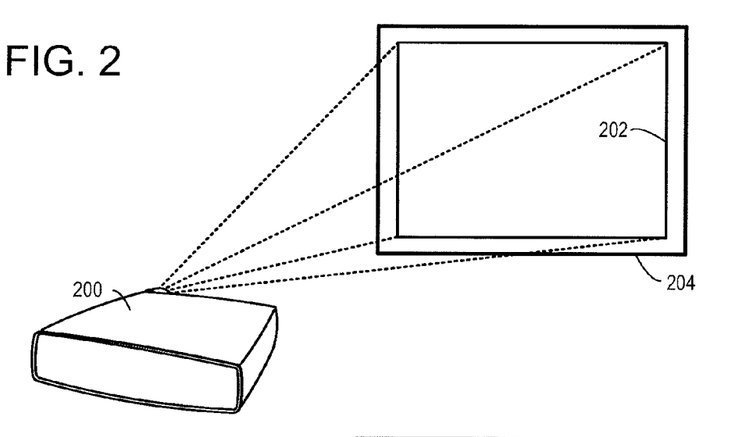
FIG. 2 shows a schematic depiction of an embodiment of an image display device.

As described above, image-generation device 104 may be configured to receive light from light source 102, and in response, generate an image. The image-generation device may include an optical engine, image-producing element, filters, color wheels, lenses, mirrors, integrators, condensers, and other suitable optical elements. Such elements may be configured to generate an image. For example, the image-generation device may include an image-producing element, such as, but not limited to, a digital micromirror (DMD), an LCD panel, or any other suitable image source. In some embodiments, the image-producing element may be configured to project light toward one or more lenses, mirrors or other optics, which, in turn, may be configured to project light toward the viewing surface. In some embodiments, a projection lens such as projection lens 106 may be configured to display the image on the viewing surface. Nonlimiting examples of the viewing surface may include a screen, a wall, etc. As an example, FIG. 2 illustrates an image display device, namely projector 200, configured to project an image 202 onto a viewing surface 204.

Continuing with FIG. 1, image display device 100 may further include memory 108. Memory 108 may be operatively coupled to a processor 110, such that processor 110 may execute instructions stored on memory 108. In such a case, image display device 100 may be configured to receive a command message in real-time via a network. Further, the command message may be sent, for example, to a select group of image display devices, as described in more detail with reference to FIG. 3.

The command message may include instructions and/or code (e.g., instant image data) indicating information of a real-time message, such as an announcement, alert, warning and the like. Upon recognizing the command message, image display device 100 may be further configured to display an alert image. In other words, the command message may include code interpretable by image display device 100, such as command line interface (CLI) commands, indicating one or more parameters of the alert image. Accordingly, upon interpreting the command message, image display device 100 may display an alert image. Example methods of such a process are described in more detail hereafter with reference to FIG. 4. The alert image may include text, images, graphics, icons, and the like indicating an alert such as a weather alert, a facility lockdown alert, an emergency warning, an instruction message, a public announcement, etc. Examples of alert images are described in more detail hereafter with reference to FIGS. 6 and 7.

Continuing with FIG. 1, in some cases, image display device 100 may be further configured to actuate a visual signal, such as a blinking light, a blinking display, blinking of the image based on the command message, blinking text, etc. Additionally or alternatively, image display device 100 may be further configured to actuate an audio signal, such as an alarm, a beep, etc. Visual and/or audio signals may be used, for example, to indicate delivery of a command message. Additionally or alternatively, such signals may be actuated to increase the awareness of the viewers to the alert image displayed.

Figure 3:
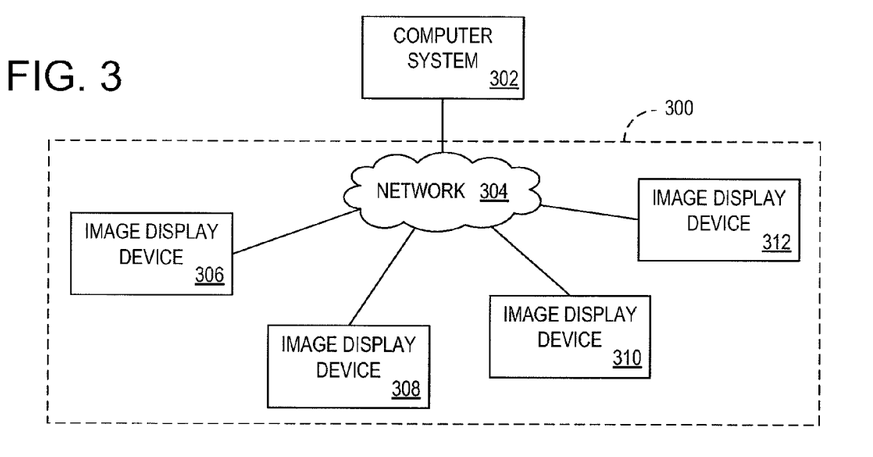
FIG. 3 shows a block diagram of an embodiment of a real-time messaging system for one or more image display devices.

As described above, in some embodiments, an image display device, such as image display device 100, may be part of a real-time messaging system. As an example, FIG. 3 illustrates generally at 300 an example real-time messaging system including one or more image display devices. An example of such an image display device may include image display device 100 discussed above with reference to FIG. 1. As an example, message system 300 may include a network 304, and one or more image display devices 306, 308, 310, and 312. In some embodiments, message system 300 may be coupled to and/or may include a computer system 302. Computer system 302 may be a control system, a software system, etc. Network 304 may be a client/server network, an active network, a peer-to-peer network, or other networks known to one skilled in the art. In some examples, one or more image display devices within short distances may communicate with a computer system via serial links. In some embodiments, for example when a computer system 302 may not be included, network 304 may function as an administrative server, a control system, a software system, etc. Accordingly, network 304 and/or computer system 302 may initiate a command message.

As described and illustrated herein, image display devices may be a projection device, such as a front projection device. However, it should be appreciated that the image display device may be other types of display devices, including, but not limited to front projection systems, rear-projection systems, etc. In other embodiments, the display devices may be LCD systems, laser systems, large format display devices, etc. The display devices may be linked together through a network such as network 304.

One or more of the image display devices on network 304 may be configured to display an alert image based on instant image data received from computer system 302 and/or network 304. The instant image data may be transmitted to the image display devices as a real-time communication via the command message. The command message may be received and displayed as an alert image. As discussed previously, the alert image may be based on instant image data, and may include, for example: announcements, alerts, messages or warnings. As further examples, the alert image based on the instant image data may be a weather alert, a facility lock down situation alerts, an emergency warning, an instruction message, a public announcement, or other message or instruction.

As discussed above, the instant image data, such as a command message, may be transmitted from network 304 and/or computer system 302 to one or more image display devices 306-312. For example, the command message may include a text string, a serial command, or other alert or instruction. In some embodiments, the command message may be sent to a select group of image display devices, for example, selectively transmitted to a subset of image display devices 306-312. The select group of image display devices may be selected by an administrator, a user, or be pre-set/preselected. In some examples, the select group of image display devices may include all devices on a network, a limited number of devices on a network, devices in an identified geographic location, devices in select rooms or in a select state (e.g., on/off), etc.

Continuing with FIG. 3, in one example, computer system 302 and/or network 304 may define a set of commands in the command message in order to coordinate communication with one or more image display devices. For example, the commands may be such that the image display devices may access the commands via a command line interface (CLI). Accordingly, such CLI commands may indicate one or more parameters of the alert image. In some embodiments, the commands may be implemented via a serial RS232 link. The commands may allow dynamic data, also referred to as a command message, to be communicated to one or more image display devices for real-time display. The command message may include code interpretable by the image display device for generating an alert image, including but not limited to text messages, graphic images, symbols, etc.

In addition to the commands, the computer system 302 and/or network 304 may support a set of source codes in the command message in order to coordinate communication with one or more image display devices. In one example, one source code may set an audio indicator to accompany the command message. An example audio indicator may be to instruct the image display device to generate an audio signal, such as a beep, while or upon, display of the command message. Such an audio signal may additionally or alternatively be generated prior to display of the command message and/or after display of the command message.

In another example, source code may include visual indicators to set visual signals that may be actuated with the communication of the command message. As an example, a visual indicator may provide a visual indicator of a blinking light, a blinking display, or other visual indication of the receipt of a command message. Other indicators may also be used to set signals to indicate delivery of a command message. Additionally or alternatively, such visual signals may be actuated prior to, during, and/or after display of an alert image. In some embodiments, both visual signals and audio signals may be actuated.

Message system 300 may be configured to power an image display device on, in the event that the image display device is powered off, in order to display a command message. In a specific example, when an image display device is powered off while a command message is being communicated to be displayed, the messaging feature of the image display device may enable powering on the image display device to display an alert image based on the command message, thereby ensuring that the target audience receive the desired message in real-time.

Referring back to FIG. 3, as illustrated one or more image display devices of the message system 300 may be configured such that, upon receiving the command message, for example from computer system 302 or network 304, the image display devices may simultaneously and instantaneously interrupt the current system state, and display an alert image based on the command message received. For example, the current system state may include a display state, a search state, a powered-off state, a presentation mode, etc. In other words, the image display device may receive a power command in real-time via the network, the power command changing the image display device from a powered-off state to a powered-on state. In some embodiments, the power command may be included within the command message. In other embodiments, the power command may be separate from the command message, for example, a command sent prior to sending the command message. Further, in some embodiments, the current system state may be a presentation mode of displaying a presentation image, wherein upon receiving the command message, one or more display settings (e.g., color, transparency, size, etc.) of the presentation image may be interrupted and/or adjusted.

In some embodiments, the command messages may be instantaneously configured by an administrator (via the computer system and/or via the network) to display a message according to current situation. For example, if a weather condition changes from 'tornado warning' to 'normal conditions', then by changing the source codes in the command message, the administrator may change the earlier weather alert of 'tornado warning' to the current weather alert of normal conditions. The system may display the message for a select period of time and then return to its previously system state. In an alternative embodiment, the image display devices may be configured such that they may not return to their previous system state until powered off.

Figure 4:
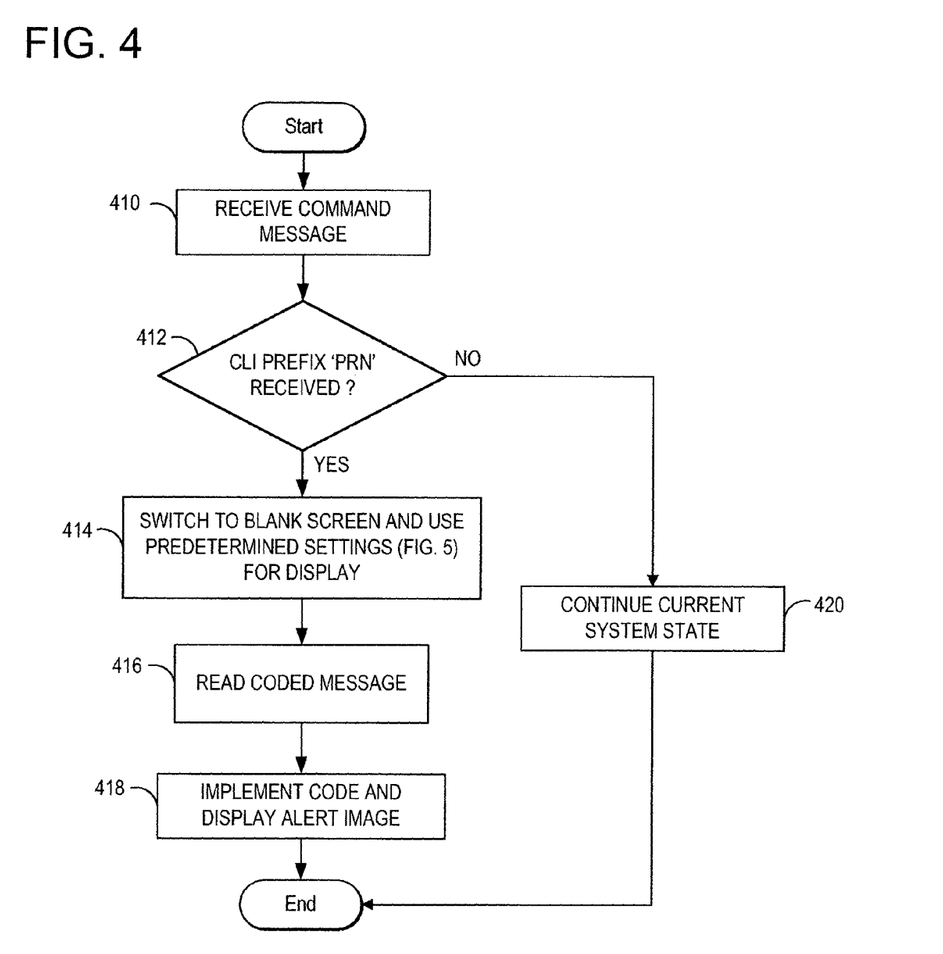
FIG. 4 shows a flowchart illustrating a process involved in the execution of an example command message according to an embodiment of the present disclosure.

FIG. 4 is an example flowchart illustrating execution of an example command message. A nonlimiting example of such a command message may include: (PRN"\a\bThis is a test"). The various steps involved in the execution of such a command message received by an image display device are explained in the flowchart of FIG. 4.

At 410 the command message may be received in real-time by the image display device. The command message may have any suitable form. For example, the command message may have a CLI prefix accompanied by source code commands along with a text message to be displayed by the image display device. Further, the command message may be sent to a select group of image display devices via a real-time network. For example, the command message may be sent to a select group of projectors within a school. The command message includes one or more parameters of an alert image, described in more detail as follows.

At 412, the image display device determines if a CLI prefix is included within the command message. For example, an image display device may be configured to recognize a command message by determining if the command message includes a CLI prefix indicating a print text command, such as 'PRN'. In other words, the selected image display devices, which may be configured to display instant or real-time messages, may be supported by this feature to recognize commands accessed via the command line interface (CLI).

If the CLI prefix is not included within the command message (e.g., the CLI prefix is not a 'PRN' command), then the routine may continue to 420, where the image display device continues with its current system state, for example, continues to operate in a current operating state. For example, the current system state may be a display state where data is being displayed, search state where data is being searched for, power off state, where the image display device is powered off, etc.

Else, the routine continues to 414, where the command may be executed. In some embodiments, upon identifying the PRN command, the image display device may adjust one or more display parameters, such as changing a color of a background displayed on the viewing screen, displaying a blank screen, using predetermined settings, and the like. Further, the on-screen display (OSD) settings may be changed according to set configuration, such as the example table 500 of FIG. 5.

Figure 5:
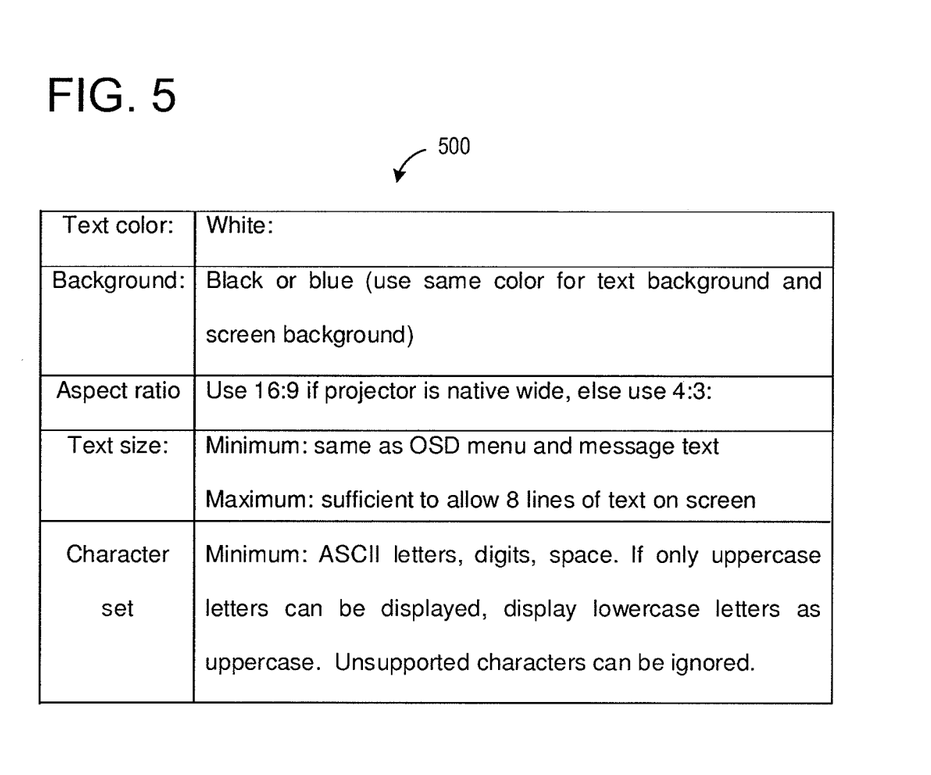
FIG. 5 shows an example table specifying example configurations of on-screen display settings for display of a command message according to an embodiment of the present disclosure.

As an example, FIG. 5 shows an example set configurations table 500 that may be implemented. For example, the text color may be set to white; the background may be set to black or blue, using the same color for text background and screen background; the aspect ratio may be set to 16:9 for native wide display, and alternatively set to 4:3 for other displays. Further, the text size may range from a minimum of the on-screen display menu settings or that of the command message, to a maximum text size that may allow eight lines of text on the screen. In addition, character set may range from a minimum of ASCII letter, digits and space, such that lowercase letters are displayed as uppercase, if only uppercase may be displayed, and such that unsupported characters are ignored. It should be appreciated that FIG. 5 is provided for illustrative purposes only and that other set configurations may be used without departing from the scope of the disclosure.

In other embodiments, the PRN command may be executed in the same way as a "printf" or "echo" commands on personal computers. For example, the PRN command may print text on the screen at the current output position. Initial position for first text output is the upper left corner of the screen. For example, the output position may be moved to the end of the printed text so that the next print command adds text at the new position instead of overwriting it. Further, if the screen becomes filled with text, additional print commands may cause the current displayed text to scroll up.

Returning to FIG. 4, at 416, the image display device reads the command message. For example, CLI prefix may be followed by a text message without any source code, or it may be accompanied by a set of source codes. The source code accompanying the text message may indicate various specifications of the displayed message. The following are some example source codes and their specifications.

\n Move output position to beginning of next line
\b Turns on blink
\s Turns off blink
\a Play a tone
\c Erase all text, turn off text display mode, return to previous system state.

Thus, if a message is accompanied by '\b', then all the text that is already displayed and incoming text may blink at a rate of 500 milliseconds on, followed by 500 milliseconds off. And, if a message is accompanied by '\s', then all the text may be continuously displayed without blinking.

In another example, if a message is accompanied by '\a', then the image display device may play a tone or the image display device may beep. The duration and frequency of the tone or the beep may be predeterminedly set. In other examples, the image display device may be set to play the tone asynchronously so that delays to the text that are printed after the '\a' command is sent may be minimized.

It may be noted that, for the CLI prefix PRN, there may be no commands available on the OSD menu of the image display device. Further, a computer system, such as computer system 302 and the multiple image display devices may support all source codes, with no different value for each source code. For example, the code '\a' (e.g., sent by the computer system 302 or network 304) may instruct the image display device to play a tone while displaying a message, and the source code may not perform any other function. Further, the command messages communicated to the image display devices may be volatile. For example, the data is erased from the image display device's memory when the image display device is turned off, and subsequently turned on.

At 418, the code accompanying the message may be implemented according to the specifications explained above in the present disclosure, and the text message may be displayed. In other words, the alert image may be generated, and upon generating the alert image, the alert image may be displayed on a viewing surface. For example, when the command message {PRN "\a\bThis is a test"} is received by the image display device, initially the screen goes blank, then the text message "This is a test" is displayed on the blank screen according to the settings specified in FIG. 5, and the displayed text may be blinking at the rate of 500 milliseconds on, and 500 milliseconds off, with the image display device beeping or playing a tone. It may be noted that the message may be erased from the screen after display, if an escape code '\c' is implemented at the end of the command message.

As described above, in some embodiments, message indicators, such as an audio indicator and/or a visual indicator, may accompany the command message, or be included within the command message, and may aid in increasing the awareness of the viewers in the command message displayed. For example, the message indicators may alert a viewer in an emergency situation, such as weather alerts, lockdown situation alerts, meeting time periods, etc.

In some embodiments, the present messaging system may enable a user to choose a select group of image display devices to communicate a command message. For example, in a school environment, the message system may be used to send a silent message to image display devices in selected classrooms. Such a message system may be required when the use of public announcement system for the entire school may be intrusive.

Figure 6:
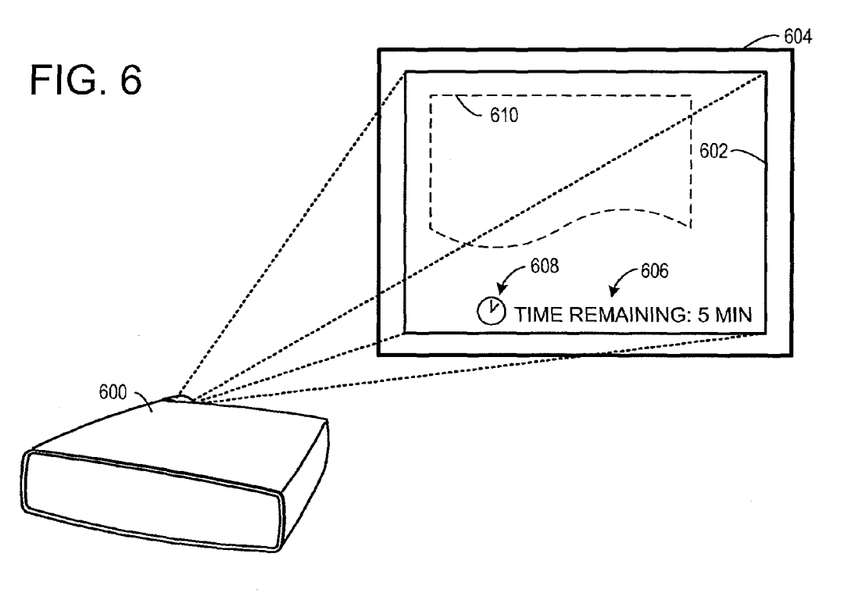
FIG. 6 shows a schematic depiction of displaying an alert image based on a command message according to an embodiment of the present disclosure.

As another example, the disclosed message system may be used to send 'time-out' messages in real-time to conference rooms. The time-out message may provide information or alerts regarding when the end time of a meeting is approaching. For example, when a meeting has five minutes left for completion, an alert message may be sent to the occupants to the approaching end of meeting, and the need to wind up the meeting for the next upcoming event within the next five minutes. As an example, FIG. 6 shows an image display device 600 displaying an alert image 602 on a viewing surface 604. As depicted, alert image 602 includes text 606 reminding occupants that the end of the meeting is approaching. In some embodiments, alert image 602 may further include an icon or picture, such as icon 608.

The alert image 602 may be displayed on a portion of the presentation image, or a region of the viewing surface. For example, in FIG. 6, alert image 602 is displayed on the bottom right-hand side of viewing surface 604. However, alert image 602 may instead be displayed in any suitable position on viewing surface 604. For example, in the case that image display device 600 is displaying a presentation image 610, alert image 602 may be displayed below the presentation image as depicted, or alternatively may be in any other position, or may alter or blackout the presentation image. For example, in some embodiments the presentation image may be partially or fully obscured and/or faded to enable the alert image to be prominently displayed on the viewing surface.

Figure 7:
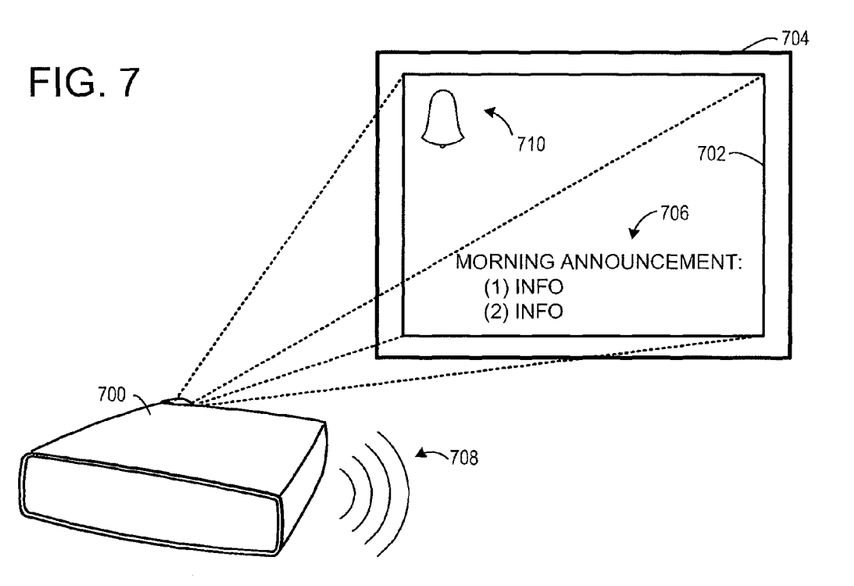
FIG. 7 shows a schematic depiction of displaying another alert image based on a command message according to an embodiment of the present disclosure.

As another example, the message system may be configured to power an image display device on, in the event that the image display device is powered off, in order to display a command message. In a specific example, when an image display device is powered off while a message is being communicated to be displayed, the messaging feature of the image display device may enable powering on the image display device to display the message, thereby ensuring that the target audience receive the desired message in real-time. As an example, FIG. 7 shows an image display device 700. Image display device 700 may be, for example, located in a classroom. Further, image display device 700 may be in a powered off state, for example, first thing in the morning at a time of a morning announcement. Image display device 700 may then receive a command message, for example via a network, to power on, and display alert image 702 on a viewing surface 704. Alert image 702 may include text 706 depicting information regarding the morning announcement. In some embodiments, the command message received by image display device 700 containing code for alert image 702 may further include an audio indicator. Accordingly, upon recognizing the audio indicator, image display device may initiate an audio signal 708 to alert students in the classroom of the morning announcement. In some embodiments, alert image 702 may further include icon 710, displayed, for example, while audio signal 708 is sounding. Further, in some embodiments, the command message may include further instructions for changing display settings of an image already being displayed by image display device 700.

Returning to the method of FIG. 4, after display of the alert image, the alert image may subsequently be removed, or alternatively, may remain as part of the presentation image. For example, an alert image regarding an end of a meeting may display for a predetermined period (e.g., one minute) and then be removed from the display. A follow-up alert image may then appear after a select period to signal the end of the meeting. In another example, the alert image may indicate an urgent weather alert (e.g., a severe storm alert), and may therefore remain on the display. In some embodiments, the alert image may continue to be displayed until the image display device is powered off, or the escape code is used to erase all the text.

Although the above embodiments describe a message system capable of implementing a CLI prefixed command message, it may be noted that the message system may be implemented in various other suitable messaging formats. For example, an image display device may be configured to implement the message system via RS232 codes and other software. Further, in some message systems, an image of an instant message may be generated on the fly and then communicated to the image display device for projection.

In this way, a command messaging system may be used to achieve real-time communication to one or more image display devices. In other embodiments, an emergency broadcast system on televisions or other monitors, or text overlay machines used in broadcasting, may include the command messaging feature of the present disclosure, thereby enabling users to configure an instant message that may be sent in real-time. It may also be noted that the instant message may be changed as the current situation demands, by changing the command message sent to the image display devices.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein.

Inventions embodied in various combinations and subcombinations of features, functions, elements, and/or properties may be claimed in a related application. Such claims, whether they are directed to a different invention or directed to the same invention, whether different, broader, narrower or equal in scope to any original claims, are also regarded as included within the subject matter of the inventions of the present disclosure.

The invention claimed is:

1. A method of selectively transmitting a command message in real-time to an image display device, the method comprising:
   selecting an image display device from a group of image display devices;
   interrupting a current mode of the image display device; and
   transmitting a command message in real-time to the image display device via a network, the command message including code interpretable by the image display device for generating an alert image.

2. The method of claim 1, wherein interrupting the current mode of the image display device includes interrupting a powered-off mode of the image display device, the method further comprising, in response, powering on the image display device.

3. The method of claim 1, wherein the code of the command message includes instructions for adjusting one or more display settings of the image display device.

4. The method of claim 1, wherein the code of the command message includes a command line interface prefix indicating a print text command.

* * * * *